(No Model.)

13 Sheets—Sheet 1.

O. TVERDAL.
CASH REGISTER.

No. 486,306. Patented Nov. 15, 1892.

WITNESSES:
F. L. Durand
J. D. Coombs

INVENTOR:
Ole Tverdal,
by Munn & Co.
Attorneys.

(No Model.)  13 Sheets—Sheet 2.
O. TVERDAL.
CASH REGISTER.
No. 486,306.  Patented Nov. 15, 1892.
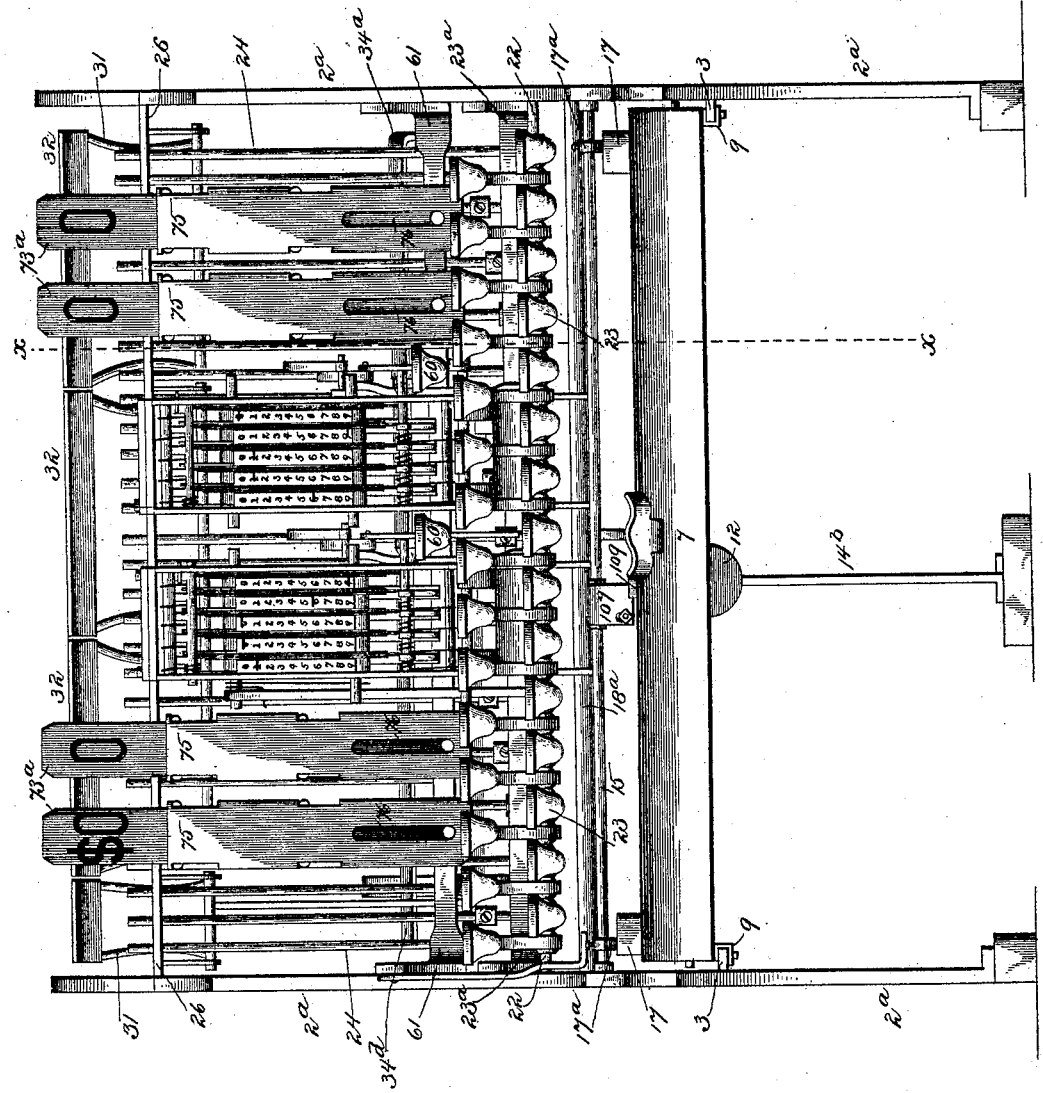
WITNESSES:
INVENTOR:
Ole Tverdal,
Attorneys (No Model.)　　　　　　　　O. TVERDAL.　　　　13 Sheets—Sheet 3.
CASH REGISTER.
No. 486,306.　　　　　　　　　　　Patented Nov. 15, 1892.
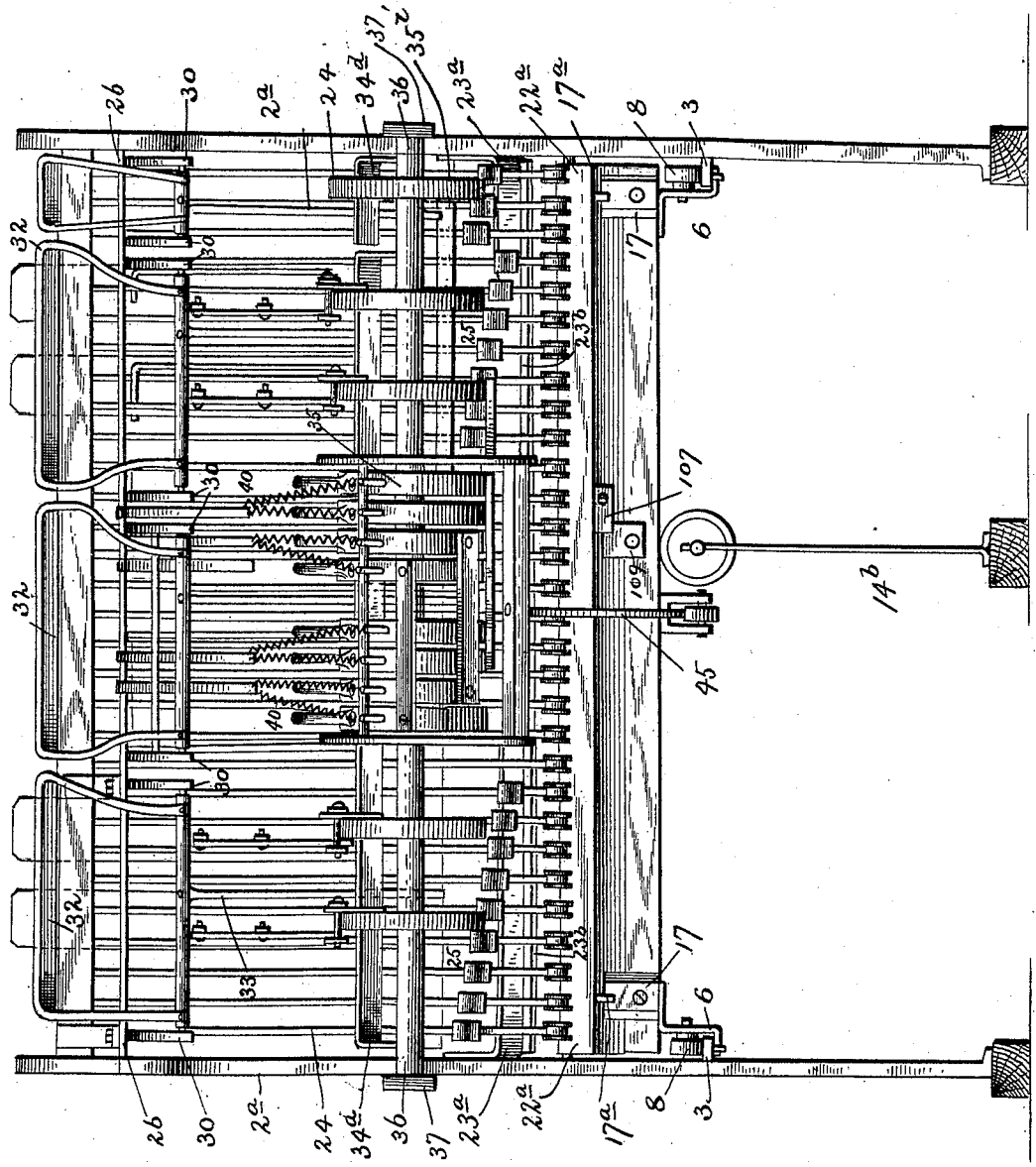

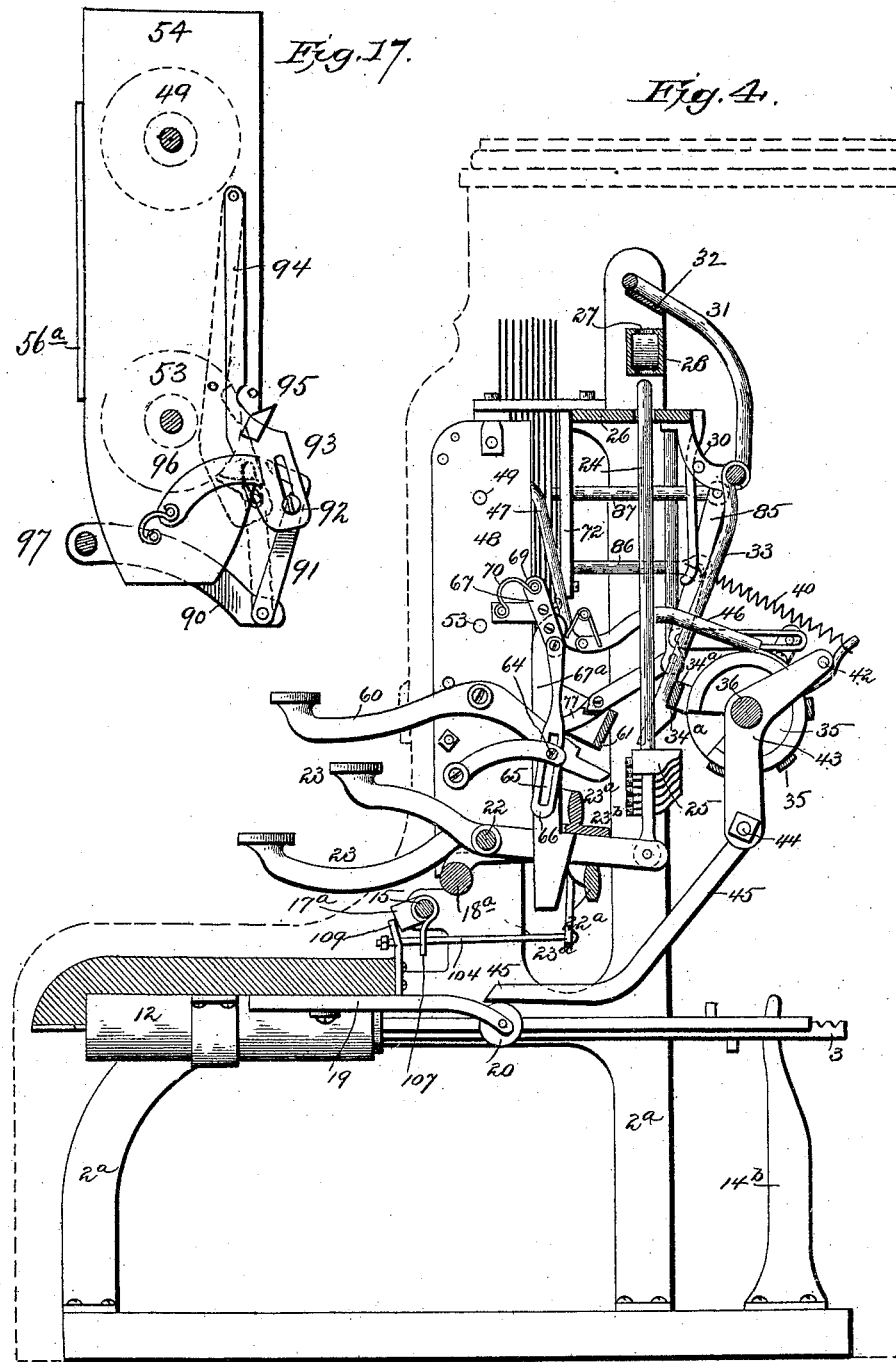

(No Model.) 13 Sheets—Sheet 5.
O. TVERDAL.
CASH REGISTER.
No. 486,306. Patented Nov. 15, 1892.
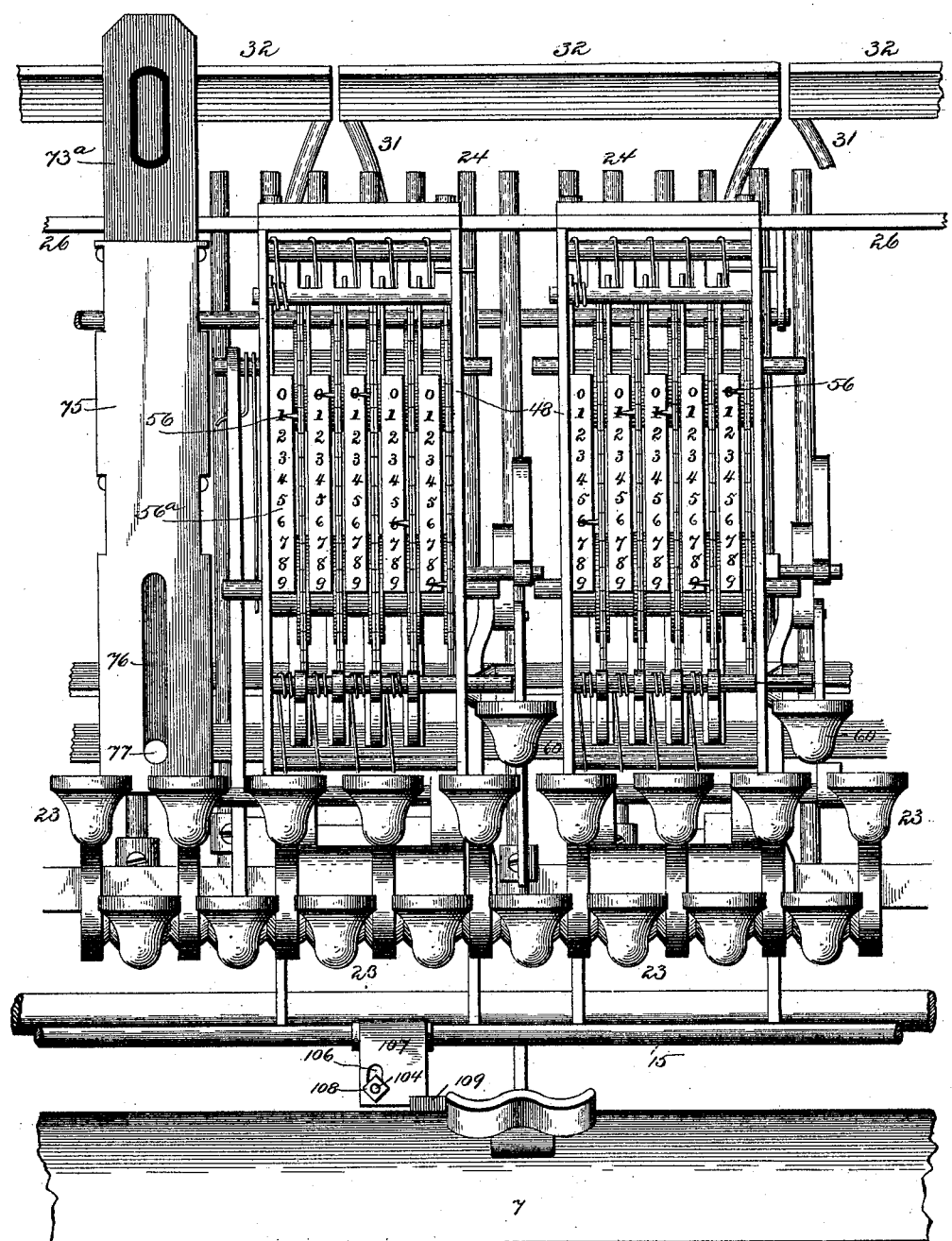

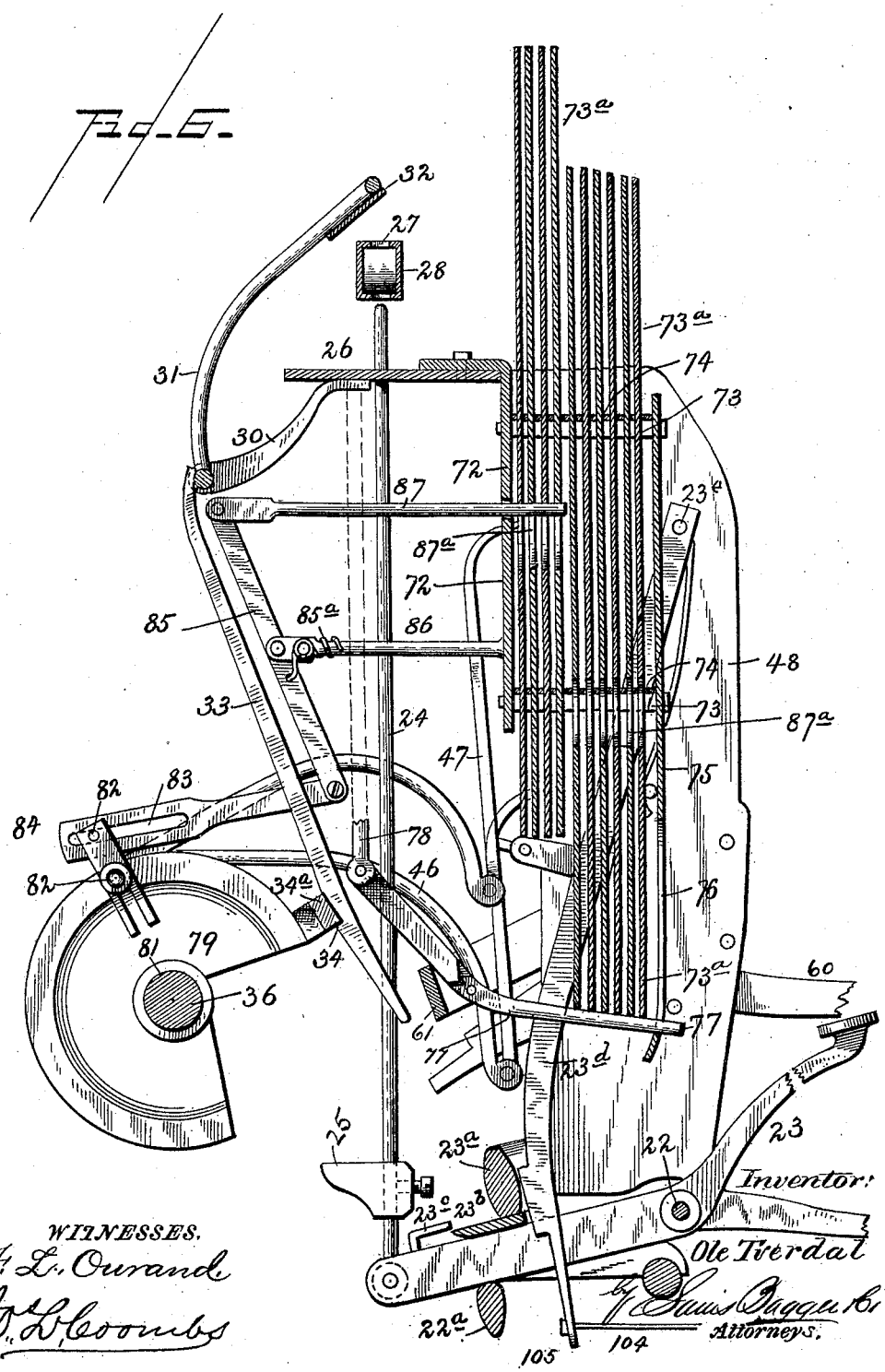

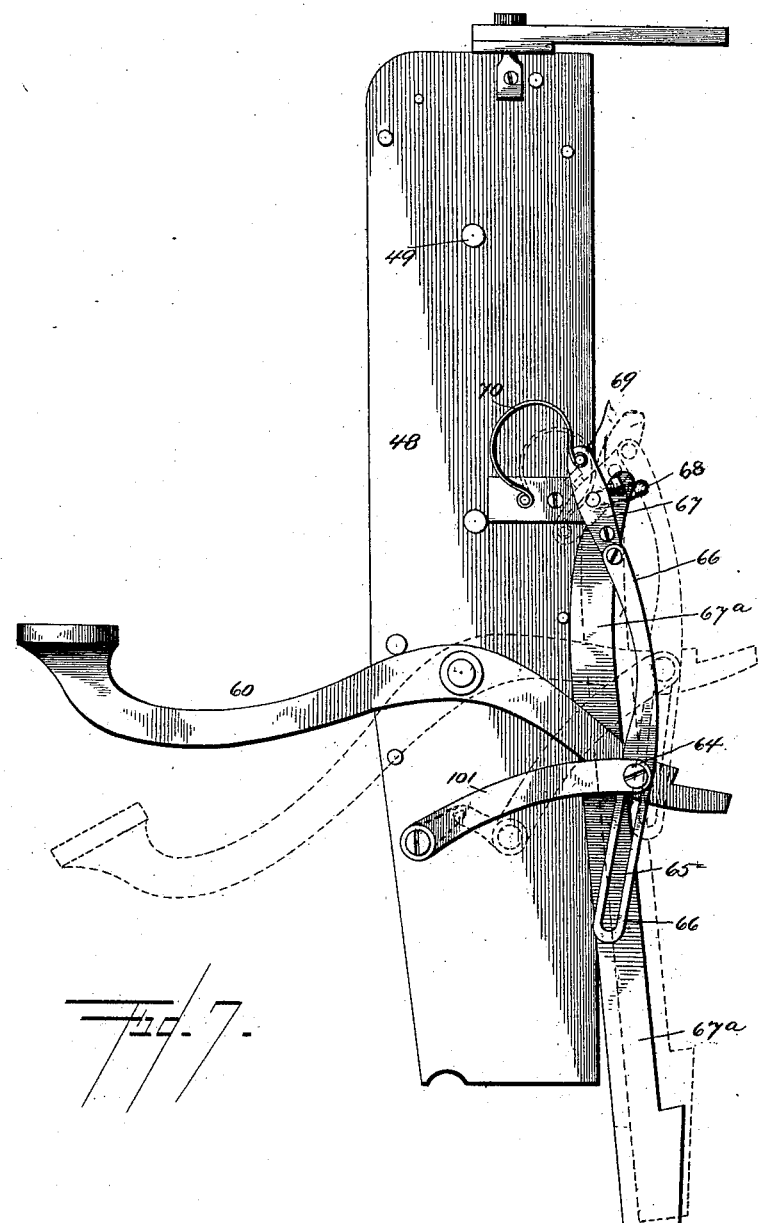

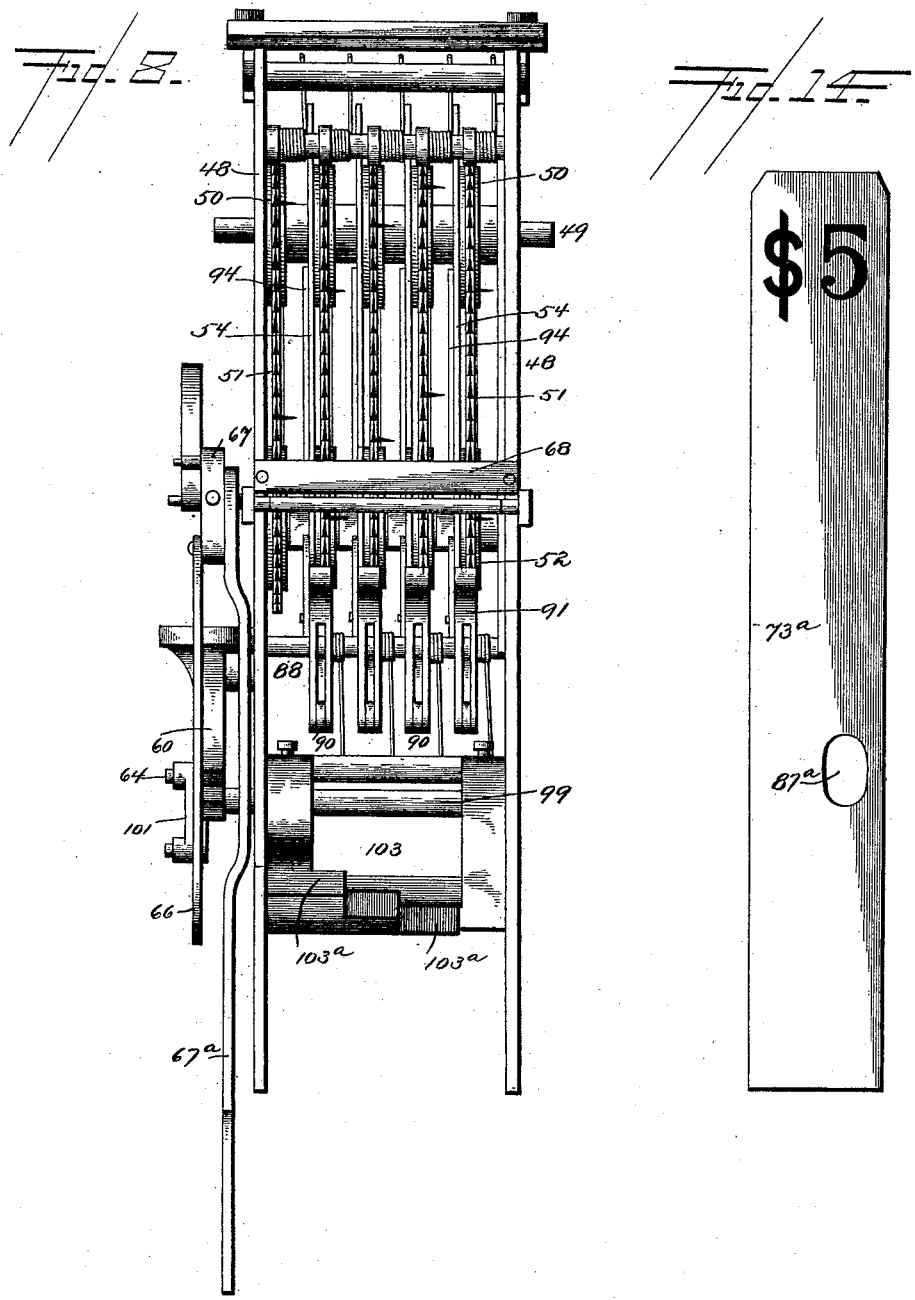

(No Model.) 13 Sheets—Sheet 9.
O. TVERDAL.
CASH REGISTER.
No. 486,306. Patented Nov. 15, 1892.
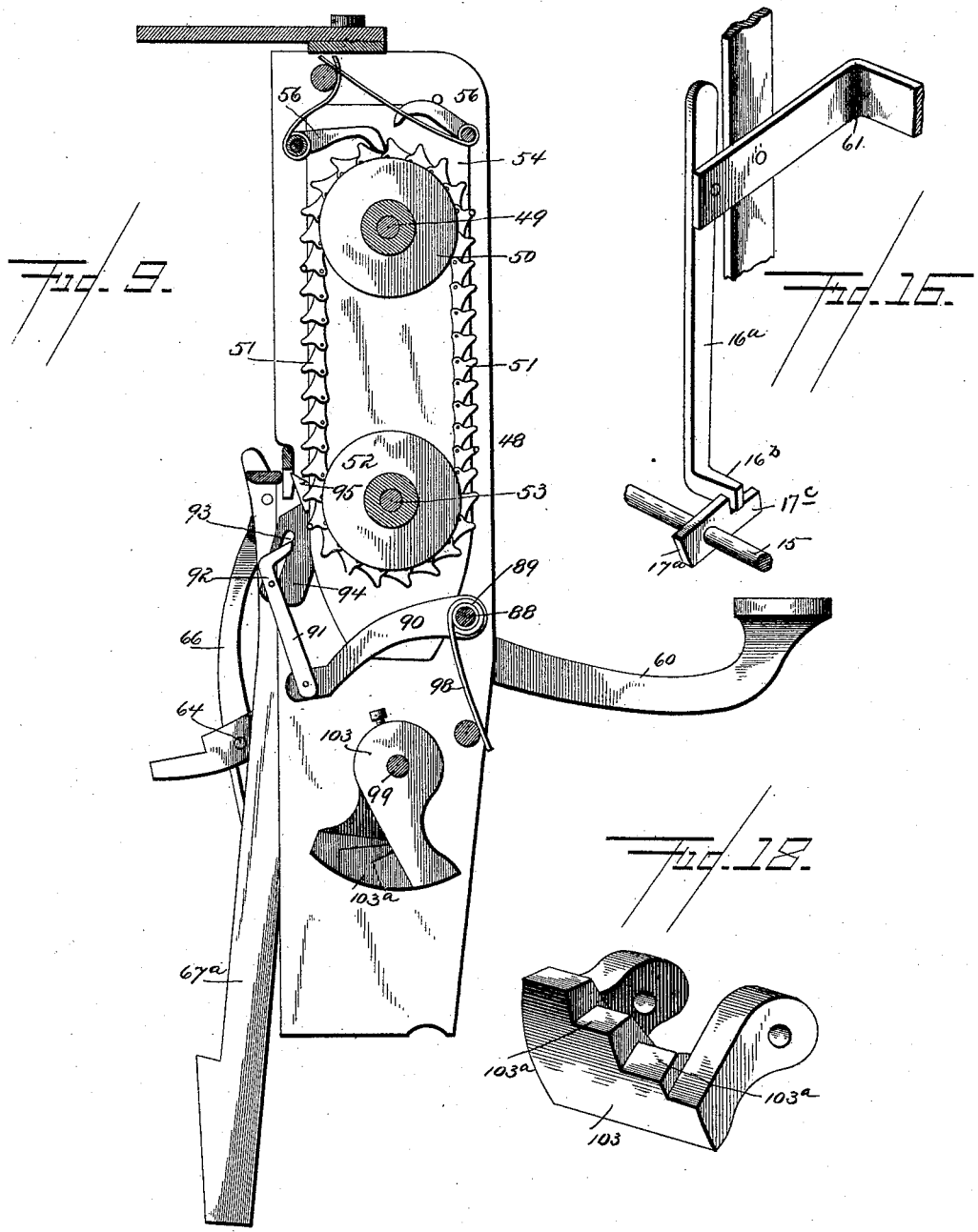
WITNESSES:
F. L. Ourand
W. L. Coombs
INVENTOR:
Ole Tverdal,
by Sunn & Gagger & Co
Attorneys.

(No Model.)  
13 Sheets—Sheet 10.
O. TVERDAL.
CASH REGISTER.
No. 486,306. Patented Nov. 15, 1892.
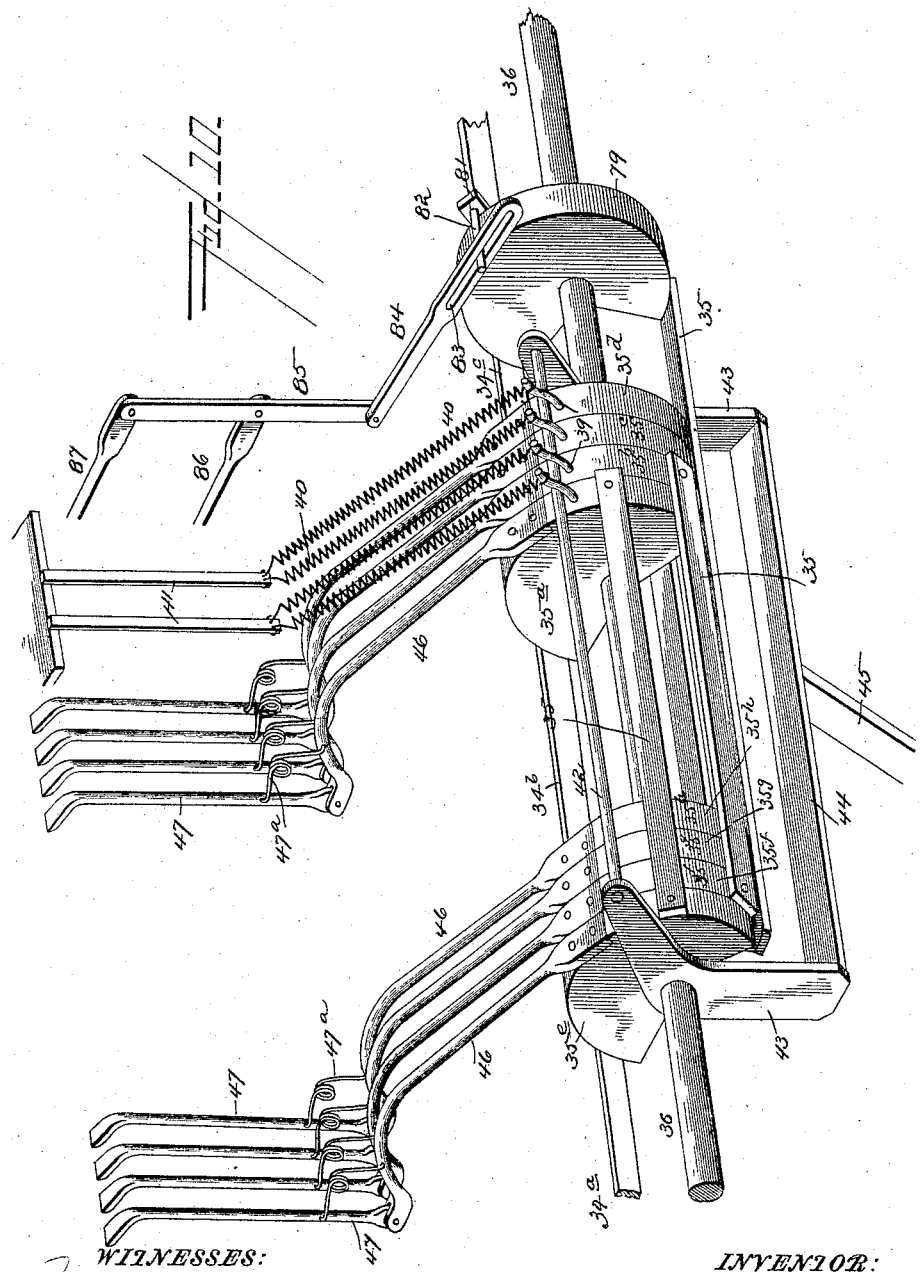
WITNESSES:  
F. L. Ourand  
J. L. Coombs
INVENTOR:  
Ole Tverdal  
J. Sauis Jagger & Co.  
Attorneys (No Model.)
13 Sheets—Sheet 11.
O. TVERDAL.
CASH REGISTER.
No. 486,306. Patented Nov. 15, 1892.
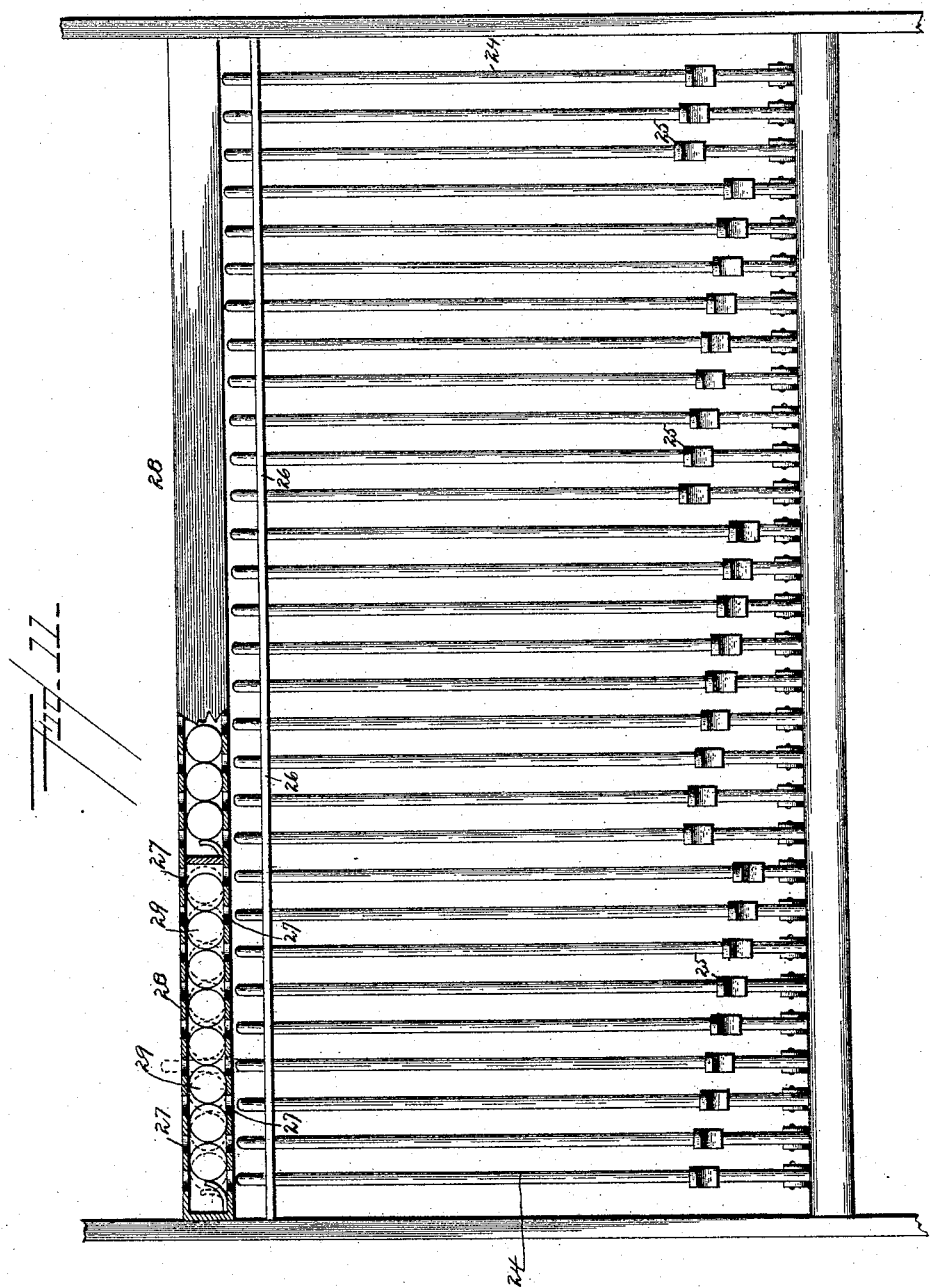
WITNESSES:
INVENTOR:
Ole Tverdal,
Attorneys.

(No Model.) 13 Sheets—Sheet 12.
O. TVERDAL.
CASH REGISTER.
No. 486,306. Patented Nov. 15, 1892.
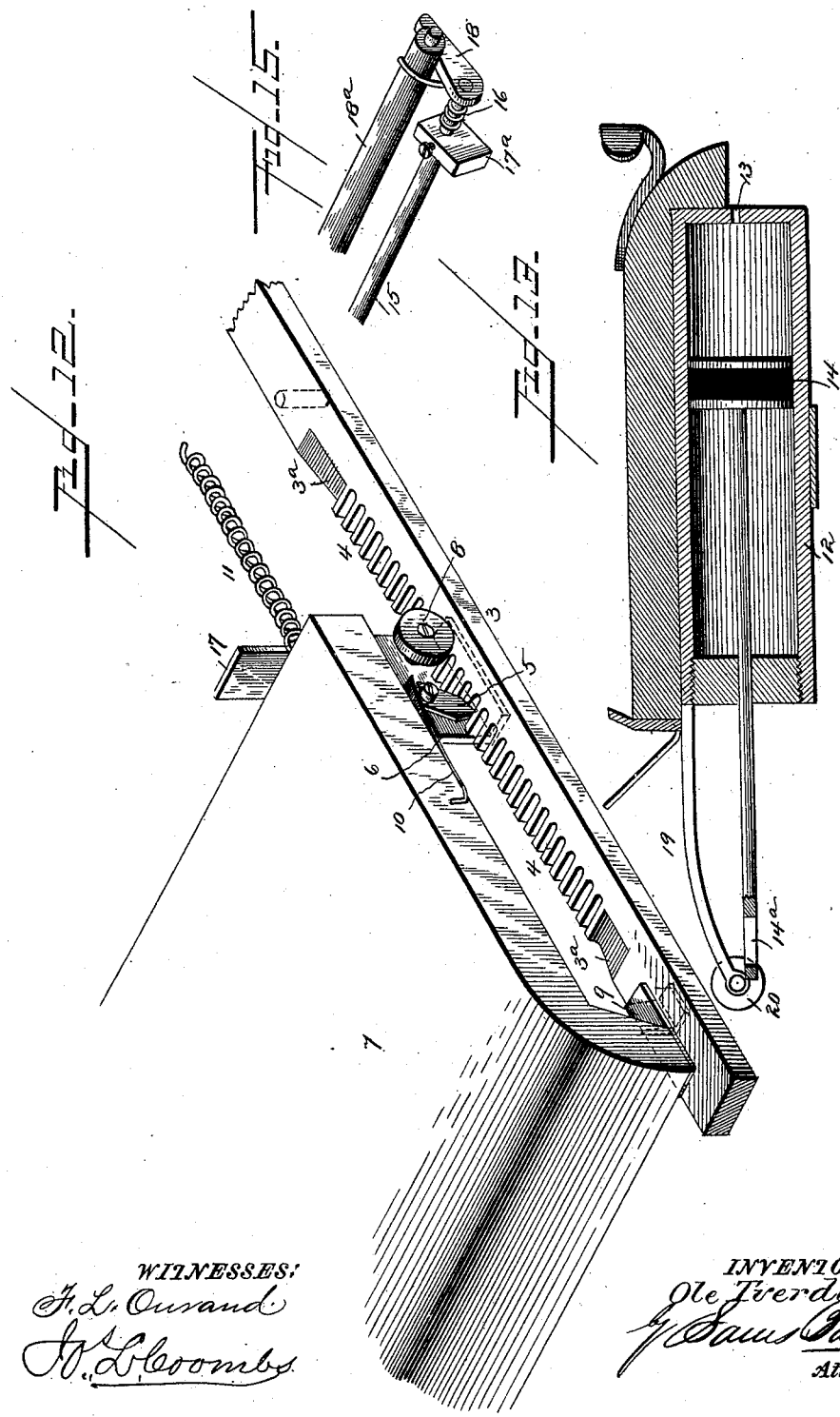
WITNESSES:
INVENTOR:
Ole Tverdal,
Attorneys (No Model.)  
13 Sheets—Sheet 13.

O. TVERDAL.
CASH REGISTER.

No. 486,306.  
Patented Nov. 15, 1892.

WITNESSES:  
F. L. Ourand  
Jo. L. Coombs

INVENTOR:  
Ole Tverdal  
G. Sauss Jagger & Co.  
Attorneys

UNITED STATES PATENT OFFICE.

OLE TVERDAL, OF STOUGHTON, WISCONSIN, ASSIGNOR TO THE UNITED STATES CASH REGISTER COMPANY, OF SAME PLACE.

CASH-REGISTER.

SPECIFICATION forming part of Letters Patent No. 486,306, dated November 15, 1892.

Application filed October 14, 1891. Serial No. 408,646. (No model.)

*To all whom it may concern:*

Be it known that I, OLE TVERDAL, a citizen of the United States, and a resident of Stoughton, in the county of Dane and State of Wisconsin, have invented certain new and useful Improvements in Cash-Registers; and I do hereby declare that the following is a full, clear, and exact description of the invention, which will enable others skilled in the art to which it appertains to make and use the same, reference being had to the accompanying drawings, which form a part of this specification.

My invention relates to improvements in cash-registers for commercial and trade purposes, by means of which the amounts of individual sales are displayed and the aggregate sales registered by depressing indicating and registering keys. By duplicating or increasing the number of registering devices the amount of change taken from the till or cash-receptacle in the course of business and credit sales may be registered by depressing the indicating-keys which are depressed in registering cash sales.

The invention consists in the novel construction and combination of parts hereinafter fully described and claimed.

Figure 1:
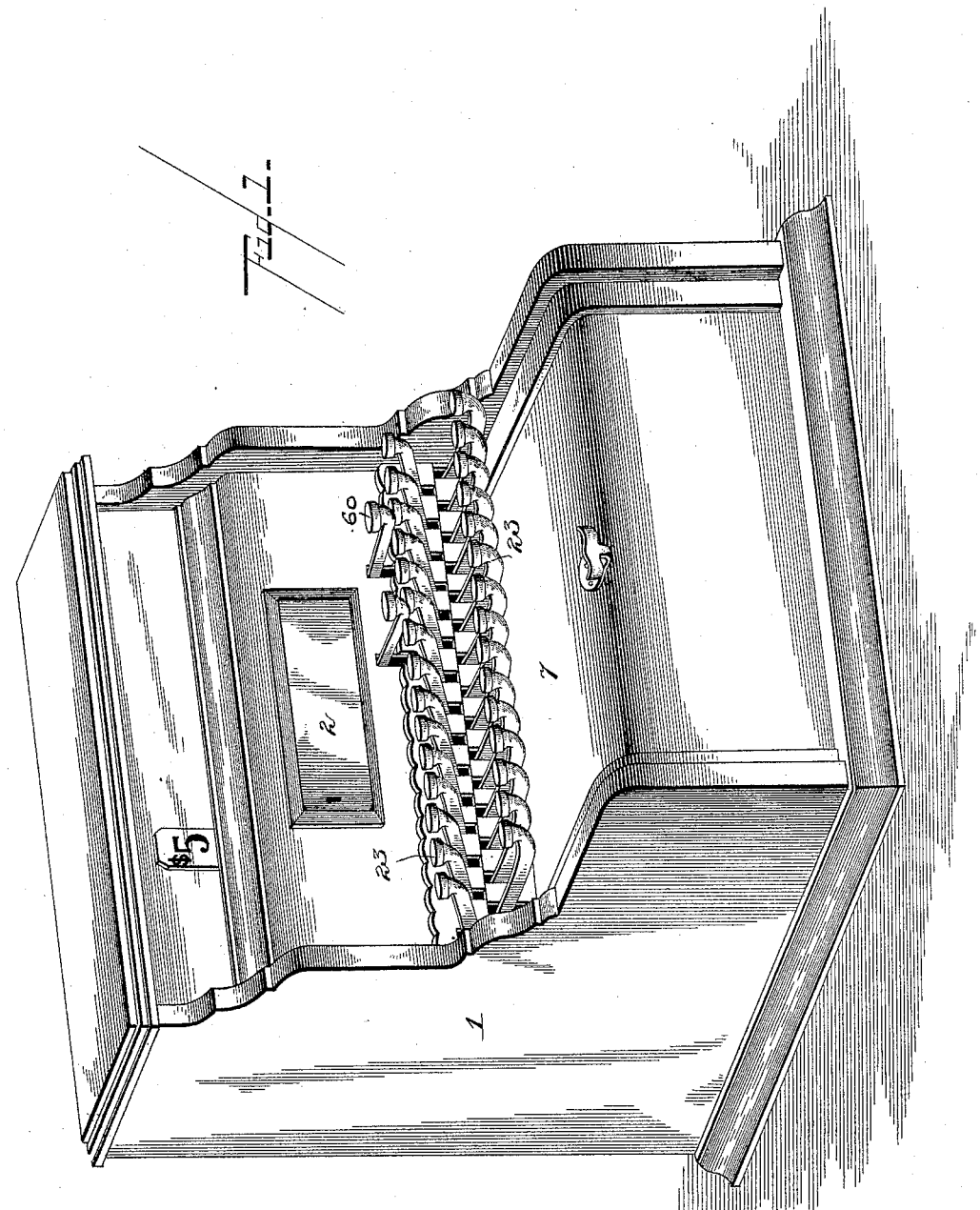
Figure 19:
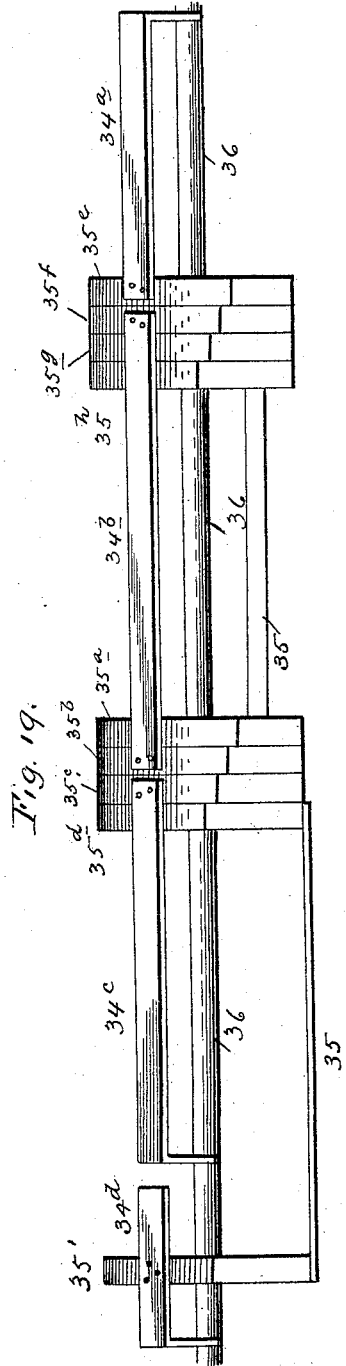
Figure 20:
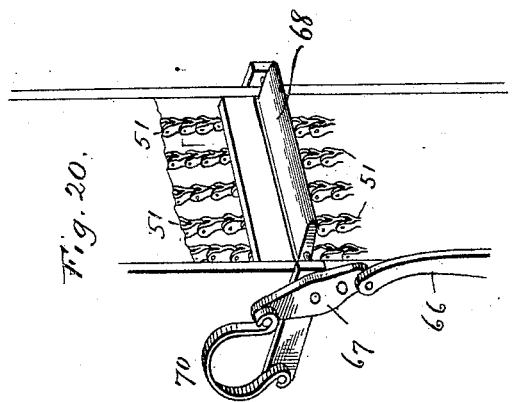

In the accompanying drawings, Figure 1 is a perspective view of a cash-register constructed according to my invention. Fig. 2 is a front view of the apparatus without the casing. Fig. 3 is a rear view. Fig. 4 is a section on the line $x$ $x$ of Fig. 2. Fig. 5 is an enlarged front elevation of the registering mechanism. Fig. 6 is a detail section showing the display-plates and means of operating the same. Fig. 7 is a side view in detail of the registering mechanism or device. Fig. 8 is a rear view of the same. Fig. 9 is a vertical central section. Fig. 10 is a detail perspective view of the registering segments. Fig. 11 is a detail view showing the rods elevated by the indicating-keys and also showing the lugs thereon at different heights or elevations. Fig. 12 is a detail view of the end of the sliding till cover or lid. Fig. 13 is a section of the air-cylinder secured to the under side of the till cover or lid. Fig. 14 is a detail front view of one of the display-plates. Fig. 15 is a detail perspective view of one of the lugs which lock the till-cover, also showing the arm for limiting the movement of said lugs. Fig. 16 is a detail perspective view of the means for unlocking the till-cover. Fig. 17 is a detail view showing the registering-chain multiplying devices. Fig. 18 is a detail perspective view of the cam-block. Fig. 19 is a detail front elevation of the segments and the bars connected therewith for limiting their movement. Fig. 20 is a detail perspective view of the plate for throwing the pitmen out of engagement with the registering-chains.

In the said drawings I have illustrated two registering mechanisms, which are separate and distinct from each other and one of which may be used to register cash sales and the other for registering change taken from the till or credit sales made. It will be obvious, however, that more or less of these registering devices may be employed if found desirable. I have also shown but three indicating-keys in the tens-of-dollars series, as this, it is believed, will be found sufficient for all ordinary purposes, although nine of them may be employed if desired.

The reference-numeral 1 designates the casing of the apparatus, the front of which is provided with apertures for the passage of the indicating and registering keys, and also with a sight-opening, through which the registering mechanism may be inspected and adjusted. This opening is closed by a hinged door or plate 2, provided with a locking device, so that it cannot be opened by unauthorized persons.

The numeral $2^a$ denotes the frame, which supports the indicating and registering mechanism and consists of side uprights connected together by a cross bar or plate 26. (See Fig. 4.) Secured to the inner sides of these uprights are two horizontal bars 3, provided with a series of teeth or notches 4, with which engage pawls 5, pivoted to plates 6, depending from the rear under side of the sliding lid or cover 7, which opens and closes the till or cash-receptacle. (See Fig. 12.) The plates 6 are also provided with rollers 8, which travel upon said bars 3. The front of the lid or cover is provided with guides 9, which embrace said bars.

Referring to Fig. 12, it will be seen that the teeth or notches 4 extend from the inner side of the bars 3 only part way to the other side, so as to leave a plain surface for the rollers 8 to travel upon. The lid is also provided with springs 10, the free ends of which bear against the upper ends of the pawls 5. The object of these pawls is to prevent a return movement of the lid or cover after it has commenced its rearward travel to open the till until it has reached the limit of its backward movement and also to prevent any backward movement thereof after it has commenced its return movement. To accomplish this, the bars 3 near each end are provided with recesses $3^a$, into which said pawls drop on the completion of the opening and closing of the till or cover. For instance, when the lid or cover has been released, as hereinafter described, and is forced back to open the till the pawls will strike the rear edges of the front recesses and be thrown toward the front of the machine and, engaging with the teeth in the bars 3, will prevent any return-movement of said cover. When the cover reaches the end of its rearward movement and the till is opened, the pawls will drop into the rear recesses $3^a$ and occupy perpendicular positions, so that when the cover begins its return movement they will strike the front edges thereof and be thrown rearwardly, so as to engage with said teeth and prevent any rearward movement of the cover until it has reached the limit of its forward movement and closed the till, when the pawls will again fall into the front recesses $3^a$.

Secured to the under side of the lid or cover at or near the center is a pneumatic or air cylinder 12, (see Fig. 13,) having a small hole or aperture 13 in the front end and provided with a piston 14, the rod of which passes through the rear head of the cylinder and is provided with a slot $14^a$, with which engages the upper end of a bar $14^b$, whereby the recoil of the lid or cover is checked when forced back to open the till or cash-receptacle. The lid or cover may also be provided with coiled springs 11, attached to the rear wall of the casing, so as to automatically operate the cover to open the till when released, as hereinafter described.

The rear edge of the cover is provided with an upwardly-extending arm 17 at each side, which are adapted to engage with lugs $17^a$ on a rock-shaft 15, journaled in the uprights $2^a$ of the frame. (See Figs. 2, 3, and 16.) This shaft is provided with a coiled spring 16, by which said lugs $17^a$ are thrown into the path of the said arms 17. This shaft is also provided with a short arm 18, which is adapted to strike a bar or rod $18^a$ and limit the movement of said shaft, which is rotated to throw the lugs out of the path of the said arms and allow the cover to slide back by means of a depending arm or rod $16^a$, secured to a bail operated by the registering-key, as hereinafter described, said arm having its lower end bent inwardly, forming a lateral arm $16^b$, adapted to strike an extension $17^c$ of one of the lugs $17^a$ on said shaft 15, and thus actuate the same.

Secured to the under side of the lid or cover is a slotted plate or arm 19, the rear end of which extends beyond the end of the lid or cover and is provided with a roller 20, with which engages an arm, hereinafter described, for operating the registering mechanism. (See Fig. 4.)

Pivoted to a transverse shaft 22, (see Fig. 4,) secured to the uprights $2^a$, are the indicating-key levers 23, alternately arranged in two rows or banks, one above the other, and having their front ends provided with cash-indicating characters or numerals and their rear ends supported by a bar $22^a$. These characters, beginning at one side of the machine, are arranged in series of nines, as above set forth, and each series corresponds with a registering device hereinafter described. These keys are preferably arranged with the keys indicating cents sales on the right of the machine, while the dollar-keys are on the left and the keys indicating decimals of a dollar intermediate thereof, although it is obvious that the order of arrangement may be reversed if desired or found convenient. As shown in the present instance, the first nine keys, which indicate the units, are arranged in regular numerical order from "1" to "9," with the odd numbers in the lower row or bank and the even numbers above. The next series of keys, representing the decimals, follow in similar order from "10" to "90," while the next series, representing the dollars, are similarly arranged and marked from "$1" to "$9," and so on.

Located above the rear ends of the indicating keys or levers is a transverse bail $23^a$, (see Figs. 2, 3, and 4,) journaled in the uprights $2^a$ and provided with a plate $23^b$, the edge of which is adapted to engage with hooks $23^c$ upon the keys 23 when the latter are actuated and their rear ends elevated, so as to retain said keys in such position, the bail $23^a$ and plate $23^b$ being held in their elevated position by a spring-actuated hooked lever $23^d$, pivoted at $23^e$ to the frame of the registering mechanism hereinafter described. This lever $23^d$ is actuated to release the said bail by a device connected with the sliding till-cover, which will be hereinafter described.

Pivoted to the rear ends of the key-levers 23 are vertical rods 24, (see Figs. 3, 4, 6, and 11,) provided near their lower ends with lugs 25, arranged at different heights thereon in regular order, forming, as it were, a series of steps, so that for each series of nine keys the lugs thereon will gradually vary in height, as seen in Figs. 4 and 11. The upper ends of these rods 24 pass through a transverse plate 26, secured to the uprights $2^a$, and also through aligned apertures 27 in rectangular boxes 28, (one for each series of keys,) provided with laterally-movable rollers 29, (see Fig. 11,) which entirely fill said boxes with the exception of a space sufficient for one of said rods to pass through. By this means but one of said bars in each series can be elevated at a time, as said rollers will spread when one rod is elevated and close the remaining apertures.

Pivoted in brackets 30 at the rear side of the transverse plate 26 are a series of bails 31, (one for each series of keys,) the upper ends of which are provided with plates 32, which are located above the boxes 28. The lower cross-bars of these bails are provided with depending rods 33, having their lower ends notched at 34 to engage with bars $34^a$, $34^b$, $34^c$, and $34^d$, connected with registering segments $35^a$, $35^b$, $35^c$, and $35^d$, journaled upon a rock-shaft 36, having its bearings in rearwardly-extending brackets 37, secured to the uprights $2^a$. These segments (see Figs. 3, 10, and 19) are alternately connected with corresponding segments $35^e$, $35^f$, $35^g$, and $35^h$, also loosely mounted on shaft 36 by means of bars 35—that is to say, segment $35^a$ is connected with segment $35^e$, $35^b$ with $35^f$, $35^c$ with $35^g$, and $35^d$ with $35^h$. Segments $35^d$ and $35^h$ are also connected with a segment $35^i$ at the left of the apparatus, as seen at the right of Fig. 3. The segments $35^a$, $35^b$, $35^c$, and $35^d$ and the corresponding segments connected therewith are entirely separate and independent from each other, so that the movement of one pair of connected segments will not in any manner affect or interfere with the others. To the segment $35^e$ is secured the bar $34^a$, which extends transversely therefrom toward the right of the apparatus above all the lugs 25 on the bars 24 of the first series of keys or those which indicate the units sales. The bar $34^b$ is secured to either or both of the segments $35^b$ and $35^f$ above the lugs 25 on the bars 24 of the second series of decimal-keys, the bar $34^c$ to the segment $35^c$ above the lugs on the bars of the third or dollar series of keys, and the bar $34^d$ to the segment $35^i$, which, as before stated, is connected with segments $35^d$ and $35^h$. By thus securing these bars to the segments $35^e$ $35^f$ or $35^b$, $35^c$, and $35^i$ they do not interfere with each other in their movements. Each of the segments $35^a$, $35^b$, $35^c$, and $35^d$ (being one for each series of indicating-keys) is provided with a radial pin 39, connected by means of springs 40 with depending arms 41, secured to plate 26. These pins are adapted to be engaged by a transverse rod 42, connected with the upper end of a bail 43, journaled on shaft 36, the lower bar 44 of which is provided with a downwardly and forwardly projecting arm 45, which is adapted to rest on the roller 20 and pass through the slot in the arm 19 when the lid or cover is forced to the rear to uncover the till, allowing the springs 40 to force the segments forwardly. On the return movement of the lid or cover the segments are returned to normal position, as hereinafter more fully described.

Each of the segments is provided with a forwardly-extending curved arm 46, (see Fig. 10,) to which are pivoted pitmen 47, which are adapted to engage with the registering-chains hereinafter described for the purpose of regtering the amount of sales made. Each of these arms and its pitman correspond with and are thrown into operative position respectively by the different series of registering-keys—that is to say, the arm and its pitman on the right of the machine are adapted to be thrown into engagement with the registering mechanism by the depression of either of the units-keys numbered from "1" to "9," while the next arm will be operated to register the decimals by the depression of the corresponding keys, numbered, respectively, from "10" to "90," and so on. The arms and pitmen are provided with springs $47^a$ to throw the pitmen forward to engage with the registering-chains.

Referring to Figs. 8 and 9, numeral 48 designates the frame of the registering devices, consisting of upright side walls suitably connected together and to the plate 26. In the upper part of these casings is secured a transverse shaft 49, upon which is journaled a series of wheels 50, which are connected by means of chains 51 with a series of similar wheels 52, journaled on a shaft 53 in the lower part of the casing. These wheels and chains are entirely distinct from each other and are separated by means of the partitions or vertical plates 54, through which the shafts 49 and 53 pass. In the upper part of said casings are arranged a series of spring-actuated pawls 55, Fig. 9, which are adapted to engage with the said chains and prevent backward movement thereof. These chains in the present instance are each provided with forty teeth, and at intervals of every ten teeth are provided with lateral fingers or pointers 56. The teeth are engaged by the pitmen 47, whereby the chains are actuated. Adjacent to each of the chains is a vertical indicating-plate $56^a$, having thereon numerals running in regular order from "0" to "9," the fingers or pointers projecting over the faces of these plates, as seen in Fig. 5. The chains and fingers are actuated by the pitmen before set forth by depressing the indicating and registering keys, and after each finger has traversed the vertical plates, or been moved nine points, the finger on the next chain to the left will be moved one point, thus indicating that the first finger has traveled nine points, and a new or succeeding pointer or finger will appear at zero on the first-named plate. These chains, fingers, and registering-plates are similar so far to those disclosed in the Letters Patent granted to me September 29, 1891, No. 460,455.

Pivoted to one of the sides of the casings 48 is a registering-key 60, Fig. 1, having its front end extending through an aperture in the front of the casing of the apparatus and its rear end formed with a notch, which engages with and actuates a bail 61, pivoted in the uprights, and which carries the depending arm $16^a$, before referred to, which releases the till cover or lid. The rear end of the lever 60 is provided with a stud or pin 64, which engages with a slot 65 in the lower end of an arm 66, pivoted to a crank 67, secured to one of the journals of a plate 68, extending across the back of the register-frame and by means of which the pitmen are held out of engagement with the teeth of the registering-chains, except when the said key is depressed to register a sale. The plate 68 is shown in Figs. 4, 7, and 8, and when in normal position it engages with the pitmen 47, forcing the upper ends thereof out of engagement with the registering-chains 51, so that if said pitmen are elevated by the segments without depressing the registering-key the said chains will not be actuated. This arrangement is employed when two or more registering mechanisms are used—as, for instance, when one registering mechanism is employed for registering sales and another for registering amounts taken from the drawer to pay bills or for other purposes—the object being to allow only the mechanism whose key has been depressed to register. The crank 67 is formed with an extension 69 and is connected with a spring 70, so that when actuated to throw the pitmen out of engagement with the teeth of the registering-chains the said plate will retain such position until again returned to normal, as hereinafter described. To the crank 67 is also pivoted a downwardly-extending arm 67$^a$, having a hooked lower end, with which the bail 23$^a$ engages when it falls, as hereinafter described, whereby said parts are returned to normal position and the plate 68 actuated to throw the pitman out of engagement with the tooth of the registering-chain.

For the purpose of displaying the amount of a sale as it is registered I provide the following arrangement: Secured to and depending from the front of the transverse plate 26 is a plate 72, having forwardly-projecting arms 73, (see Fig. 6,) which embrace a series of vertical plates 73$^a$, provided at their upper ends with numbers or characters corresponding with those on the indicating-keys, said plates being separated from each other by means of transverse bars 74, attached to said arms. Secured to the front ends of these bars is a vertical plate 75, having a slot 76 near its lower end, through which projects the front end of a two-armed lever 77, said arms being pivoted to each other and the rear arm pivoted to a depending rod 78, secured to the transverse plate 26. This lever 77 rests upon the bail 61, so that when the same is raised by the registering-key said lever will also be raised, elevating the vertical plates 73. It should be noticed that there are four of these indicating or display devices illustrated, one for each series of keys, and adapted to display, respectively, units, tens of units, dollars, and tens of dollars; but a description of one will suffice for all. For each of these devices the shaft is provided with a segment 79, Fig. 3, corresponding to and being connected by means of the bars 35$^a$ with the register operating segments with which they correspond. To each segment 79 is pivoted a slotted adjustable arm 81, having a pin 82, which works in a slot 83 in an arm 84, which is pivoted to the lower end of a lever 85, pivoted to a rearwardly-extending arm 86, secured to the plate 72. The upper end of this lever is provided with a forwardly-extending rod 87, which projects through an aperture in the plate 72 and through slots 87$^a$ in the display-plates 73$^a$, situated near the center thereof. The lever is also provided with a spring 85$^a$ to project it through the slots in said plates. The operation of this device is as follows: The plates 73$^a$ are arranged in numerical order and increase in value from front to rear, zero being outermost, and at the commencement of a day's work they are at their lowermost position, with their lower ends resting on the lever 77. When a sale is made and the appropriate indicating-key and registering-key are depressed, the bail 61 will be elevated, which in turn elevates all of said plates until the slots therein are aligned with the rod 87, which will be projected therethrough by means of its spring. When the cover or lid is actuated to operate the registering segments, the segment 79 connected with such segment will also be actuated, the pin 82 striking the forward end of slot 83, moving arms 84 rearwardly and causing the rod 87 to be moved back a distance corresponding to the movement of the registering segment, allowing the display-plates cleared by said rod to fall down and the amount on the plate at the end of said rod to be displayed. These plates will remain in this position until the keys are again depressed to register another sale, when the operation is repeated. It will also be noted that the bar 34$^a$, connected with the dollar series of indicating-keys, is secured to the segment 79, which is connected with the corresponding or dollar segment 35, although it is obvious that said bar might be connected direct with the segments 35.

For the purpose of moving one of the fingers of registering-chains one point by means of the registering-key when an adjoining chain registering less values has made ten movements or points, I provide the following means: Journaled upon a shaft 88, Figs. 9 and 17, in the lower part of the register-frames are a number of collars 89, having rearwardly-extending arms 90, to which are pivoted upwardly-projecting pawls 91, having pins 92 near their upper ends, which work in slots 93 in levers 94, pivoted to the partitions 54 near the upper ends. These levers are provided with lugs 95, which the fingers or pointers are adapted to strike in their travel. They have, also, forwardly-extending arms 96, connected with springs 97, secured to the lower ends of said partitions. The collars 89 are also provided with springs 98. In the lower part of the register-frame is journaled a rod or shaft 99, one end of which is provided with a crank 100, with which is connected an arm 101, pivoted to stud 64, which works in the slot 65 in arm 66. Upon the rod 99 is fixed a segmental cam-block 103, having its upper end formed with a series of steps 103ª, which are adapted to engage with the rear ends of the arms 90. The operation of this part of the invention is as follows: When the fingers are not in engagement with the lugs 95, the upper ends of the pawls 91 are thrown outwardly or rearwardly, so that they will not engage with the teeth of the registering-chains. Supposing, however, that one of the registering-chains—say, for instance, the one indicating cents sales—should have been operated to register sales amounting to nine cents, the finger or pointer will strike the lug 95 on the adjoining lever 94, causing the lower end thereof to be moved slightly forward and causing the pawl 91 also to be moved forwardly, so as to engage with one of the teeth on the next chain, or the one registering the tens. Upon the next depression of a registering-key the first step on the cam-block will strike the rear end of the lever, causing the pawl to be elevated and the chain to be moved the extent of one tooth, when the finger on the plate registering the tens of units or decimals of a dollar will also move one point, thus indicating that ten sales to the value of ten cents have been made. At the same time a new finger on the cents-plate will appear and point to zero.

For the purpose of releasing the lever 23ᵈ and allowing the bail 23ª and the indicating-key by which it was actuated to return to normal position, I provide the following means: Passing loosely through an aperture in the lower end of said lever is a rod 104, having a head 105 at its rear end. The front end of this rod passes through a slot 106 in a depending plate 107, pivoted to the transverse bar 15. The front end of this rod is screw-threaded, with which engages an adjusting-nut 108. This plate is adapted to be struck by an arm 109 on the rear end of the sliding till-cover on its return movement after a sale is registered and by means of the rod 104, which pulls the lever 23ᵈ forward and out of engagement with the bail 23ª, allowing the same to drop to normal position.

The operation is as follows: When a sale is made—say, for instance, five cents—the indicating-key representing this amount is depressed, elevating the rod 24 connected therewith, the upper end of which will strike the plate 32 of bail 31 and cause the rod 33 to become disengaged from the bar 34ª, allowing the latter to fall until stopped by the lug on said rod 24. At the same time the hook on the key will engage with plate 23ᵇ of bail 23ª, and the latter will be elevated and retained in such position by the notched lever 23ᵈ engaging therewith. The registering-key 60 of the registering mechanism which registers the sales is then depressed, and its rear end, striking the bail 61, will cause the same and the two-armed lever 77 to be correspondingly elevated, the latter also elevating the display-plates 73ª, which rest thereupon, until the apertures 87ª are aligned with the horizontal rod 87. (See Fig. 4.) At the same time the opposite ends of the bail 61 will depress rod 16ª, causing its bent arm 16ᵇ to engage with the notch or extension 17ᶜ of lug 17ª, causing the latter and its corresponding lug on the opposite end of shaft 15 to be thrown out of engagement with the arms 17 on the rear of the till-cover and allowing the latter to be opened or pulled back by the coiled springs 11. As the said cover slides back the roller 20 on the slotted arm 19 will move under the horizontal portion of arm 45 until the curve therein is reached, when said arm will fall down into the slot, thus releasing the bail 43 and causing the connected segments 35ª and 35ᵉ to be rotated by means of the pins 39 and spring 40. It will be noted (see Figs. 4 and 10) that the bail 43 by means of the rod 42 prevents any movement of the segment until released by the opening of the till-cover. The movement of the segments 35ª and 35ᵉ and of the pitmen 47, connected therewith, is limited by the bar 34ª, engaging with the lug 25 on the bar 24, connected with indicating-key depressed, which causes the pitmen to fall a distance corresponding with the key depressed. As in the present instance the six-cent key is depressed, the pitmen will drop a distance equal to seven teeth on the cents-registering chain 51. As the segments 35ª and 35ᵉ are actuated they will also turn segment 79, connected therewith, which by means of pin 82, striking the inner end of slot 83 in arm 84, will actuate lever 85 and cause bar 87 to be withdrawn from the apertures 87ª in the display-plate until the six-plate, or the one that indicates that a sale of six cents has been made, is reached, as seen in Fig. 6, so that when the key 60 is released and allowed to return to normal position, the first six of the plates 73ª, having the characters from "0" to "5" thereon, will fall, as seen in said figure, with the balance of the plates 73ª held in their elevated position by means of rod 87, with the character "6" displayed, thus showing that a scale of six cents has been made. As said key 60 is depressed and at the same time the above movements are taking place the arm 66 will be elevated, actuating the crank 67 and throwing the transverse plates 68 up and out of engagement with the pitman 42, as seen in dotted lines, Fig. 7, so that as said pitman is elevated, as hereinafter described, it will engage with its registering-chain and move the same to the extent of six teeth, which will be indicated by the pointer 56 on its corresponding indicating-plate 56ª. The cam-block 103 will also be actuated by shaft 99, crank 100, arm 101, stud 64, and arm 66, for a purpose heretofore described. The notched arm 67 will also be raised, so as to engage with bail 23ª. As the pressure on key 60 is relieved said key will return to normal position, allow bail 61 and two-armed lever 77 to also return to normal and the display-plates not engaged with rod 87 to fall and leave the plate bearing the numeral "6" exposed. As the till-cover is closed the arm 109 will strike the nut 108 of the rod 104 and the lever 23ᵈ is thrown out of engagement with the bail 23ᵃ, allowing the same to drop. It also strikes plate 107 to actuate shaft 15 and lugs 17ᵃ to lock the cover. In the return movement of said cover the roller 20 will engage with and actuate the bent arm 45, which in turn will actuate bail 43, which by its rod 42 and the pins 39 return the segments 35ᵃ and 35ᵉ to normal. In this movement the segments will elevate the pitman connected therewith and cause it to engage with and actuate its registering-chain to the extent of six teeth. As the bail 23ᵃ falls, as before set forth, it will carry with it the arm 67ᵃ, which will by means of crank 67 return plate 68 to normal, so as to prevent engagement of the pitmen with the registering-chains until the key 60 is again depressed. As the cam-block 103 is oscillated by the key 60 and connections the steps 103ᵃ will successively strike the arms 90 and elevate the pawls 91, which will ride past the registering-chains 51 without engaging therewith, and consequently without moving them. When, however, any pointer on the registering-chains has moved nine points thereon, the pointer on the next-adjoining chain of higher value is moved one point. To more clearly illustrate, let it be supposed that the pointers on all the chains point to "0." Now suppose that a scale of six cents value is made, then the pointer on the cents-registering plate will point to "6" by the means before set forth. Now suppose that a three-cent sale is made and the pointer advanced to "9." Upon the next depression of the indicating and registering keys, when, say, a one-cent sale is made, the first-named pointer will disappear and a new pointer will appear at "11," while at the same time the pointer on the dime-plate will advance to "1," thus indicating that sales aggregating ten cents have been made. This is accomplished by one of the pointers on the cents-registering chain striking the beveled lug 95 on the next-adjoining lever 94, causing said lever to be forced inward until its slot 93 is aligned with pawl 91, which is correspondingly thrown inward, so that when elevated by the cam-block it will engage with one of the teeth of the dime-registering chain and move the same one point. The operation is identically the same with respect to the other registering-chains. As the indicating-keys 23 are arranged in separate and distinct series, it is obvious that any key in one series can be depressed simultaneously with any of the keys in the other series without in any manner interfering with each other, as each series is provided with independent pitmen and means for actuating the same. For instance, suppose a sale aggregating one dollar and forty-eight cents is made. Then the "$1" key in the dollars series, the "4" key in the dimes series, and the "8" key in the cents series are all depressed simultaneously and the registering-chains 51 corresponding therewith, respectively, are also simultaneously actuated. It thus frequently happens that two or more of the registering-chains are about to be moved by the pawls 91 by a single depression of the registering-key. If these pawls were all moved at the same time, it would require too great a pressure on said key. To overcome this, I provide the block 103 with the steps 103ᵃ, whereby the pawls are actuated successively instead of simultaneously, thereby rendering the strain upon the finger less severe.

As before stated, I employ in the present instance two registering mechanisms, and consequently have to employ two sets of segments 35; but when but one of said registering mechanisms is employed one of said sets of segments is dispensed with. As these registering mechanisms are entirely separate and distinct from each other and as they can only be made to register by depressing the key connected therewith, it follows that one may be employed to register cash sales made and the other credit sales or to register change taken from the till or for other purposes. As before stated, these registering mechanisms cannot be operated without depressing their appropriate keys, as the bail 23ᵃ in falling engages with the notched end of the arm 67ᵃ and throws plate 68 out, so as to prevent the pitmen from engaging with the teeth of the registering-chains until said plates are thrown back by depressing said keys. I have also in the drawings but three indicating-keys in the tens-of-dollars series, as these will be found sufficient for all ordinary purposes. These keys are provided with the connections similar to those of the other keys. An additional segment 35ⁱ is also employed, connected with the segment 35ʰ, which corresponds with the dollar-indicating keys. The operation is identical with that of the other indicating devices.

In Fig. 3 I have shown the segments of each of the series of registering devices provided with springs 40; but one of the sets of springs may be dispensed with, as will be obvious.

Having thus described my invention, what I claim is—

1. In a cash-register, the combination, with a series of indicating-keys, of the vertical bars pivoted thereto and provided with lugs at varying heights, the pivoted bails with which said bars are adapted to engage, and the downwardly-depending hooked arms secured to said bails, substantially as described.

2. In a cash-register, the combination, with a series of indicating-keys, of the vertical bars connected therewith, having lugs at varying heights, the pivoted bails with which said bars are adapted to engage, the downwardly-depending hooked arms secured to said bails, the segments, and means, substantially as described, for actuating the same.

3. In a cash-register, the combination, with the series of indicating-keys, of the vertical bars pivotally connected therewith, the lugs thereon at varying heights, the pivoted bails with which said bars are adapted to engage, provided with downwardly-extending hooked arms, the transverse shaft, the segments journaled thereon, provided with horizontal bars with which said hooked arms engage and with radial pins, the springs connected with said pins, and the bail pivoted on said rock-shaft, having a transverse bar adapted to engage with said pins, substantially as described.

4. In a cash-register, the combination, with the series of indicating-keys, of the vertical bars pivotally connected therewith, the lugs thereon at varying heights, the pivoted bails with which said bars are adapted to engage, provided with downwardly-projecting hooked arms, the transverse shaft, the segments journaled thereon, provided with horizontal bars with which said hooked arms engage and with radial pins, the springs connected with said pins, the bail pivoted on said rock-shaft, having a transverse bar adapted to engage with said pins, and the downwardly and forwardly extending arm connected with said bail and adapted to be actuated by opening and closing a sliding till-cover, substantially as described.

5. In a cash-register, the combination, with the series of indicating-keys, of the vertical bars pivoted thereto, having lugs at varying heights, the pivoted bails with which said bars engage, provided with downwardly-projecting hooked arms, the transverse shaft, the segments journaled thereon, provided with horizontal bars with which said hooked arms engage and with radial pins, the springs connected with said pins, the bail pivoted on said shaft, provided with a transverse bar with which said pins engage, the downwardly and forwardly extending arm secured to said bail, and the sliding till cover or lid having a slotted arm and roller, substantially as described.

6. In a cash-register, the combination, with the registering mechanism consisting of a frame, a series of wheels at the top and bottom thereof, chains passing over said wheels and divided at regular intervals by lateral fingers or pointers, and a series of registering-plates having numbers thereon running from "0" to "9," of the spring-actuated pitmen, the arms to which said pitmen are pivoted, the spring-actuated segments, the bail having a transverse bar with which said pins engage, and means, substantially as described, for actuating said segments.

7. In a cash-register, the combination, with the registering mechanism consisting of a frame, the loose wheels journaled therein, the chains having fingers or pointers at regular intervals, and the registering-plates, of the registering-key pivoted to said frame, the arm connected therewith, the crank with which said arm is connected, and the transverse plate journaled to the frame and connected with said crank, substantially as described.

8. In a cash-register, the combination, with the registering mechanism comprising the frame, the loose wheels, the chains passing over said wheels, having lateral fingers or pointers at regular intervals, and the registering-plates having numerals thereon running from "0" to "9," of the registering-key pivoted to said frame, having a pin or stud near its rear end, the slotted arm in which said stud works, the crank connected with said arm, and the transverse plate journaled in said frame and connected with the crank, substantially as described.

9. In a cash-register, the combination, with the registering mechanism comprising the frame, the loose wheels, the series of chains running over said wheels and provided with lateral fingers or pointers, of the oscillating block having steps located in the lower part of said frame and the registering-key connected with said block, substantially as described.

10. In a cash-register, the combination, with the registering mechanism comprising the frame, the loose wheels, the series of registering-chains passing over said wheels, provided with lateral fingers or pointers, and the registering-plates, of the oscillating block having steps located in the lower part of the frame, the rearwardly-extending spring-actuated arms journaled on a bar connected with the frame and provided with upwardly-extending arms having studs or pins, the downwardly-depending levers pivoted to partitions in the frame and having slots in their lower ends with which said pins or studs engage, and the registering-key having an arm connected with a crank on the journal of said oscillating block, substantially as described.

11. In a cash-register, the combination, with a registering mechanism, substantially as described, of the pivoted registering-key having a stud near its rear end, a slotted arm connected therewith, a spring-actuated crank connected with said arm, and a downwardly-depending hooked arm adapted to engage with the bail which is elevated by depressing the indicating-keys, substantially as set forth.

12. In a cash-register, the combination, with the supporting-frame, a registering mechanism substantially such as described, the registering-key, and the bail journaled in said frame, of the display-plates having slots intermediate their ends, the frame in which said plates are located, the two-armed pivoted lever actuated by said bail and supporting the lower ends of the display-plates, the pivoted lever having a forwardly-extending arm at its upper end and a rearwardly-extending arm at its lower end, the segment connected with said arms, journaled on the transverse rock-shaft which carries the registering segments, and the bars connecting said segment with a registering segment, substantially as described.

13. In a cash-register, the combination, with the supporting-frame, a registering mechanism substantially such as described, the registering-key, and the bail journaled in said frame, of the display-plates having slots intermediate their ends, the frame in which said plates are located, the two-armed pivoted lever actuated by said bail and supporting the lower ends of said display-plates, the pivoted lever having a forwardly-extending arm at its upper end and a rearwardly-extending arm provided with a slot at its lower end, and the segment having an adjustable arm provided with a stud or pin working in said slot, substantially as described.

14. In a cash-register, the combination, with the supporting-frame and the spring-actuated pivoted hooked arm having an aperture at its lower end, of the headed rod passing through said aperture, a plate pivoted to a transverse rod journaled in the supporting-frame and having an aperture through which said rod also passes, the adjustable nut on the front end of said rod, and the sliding till cover or lid having an upwardly-projecting arm or plate adapted to engage with said pivoted plate, substantially as described.

15. In a cash-register, the combination, with two or more registering devices substantially such as described, of corresponding series of segments having arms and pitmen adapted to actuate said registering mechanism and horizontal bars connecting the corresponding segments of the series together, substantially as described.

16. In a cash-register, the combination of the supporting-frame, the indicating-keys having hooks near their rear ends, the transverse bail having a plate adapted to engage with said hooks, the spring-actuated hooked arm engaging with said bail, the vertical bars having lugs varying in height, connected with said keys, the bails having transverse plates with which the upper ends of said rods engage, the downwardly-depending hooked arms secured to said bails, the shaft journaled in said frame, the segments journaled on said shaft, having horizontal arms adapted to engage with said arms, the radial pins on said segments, the springs for actuating the same, the bail pivoted to said shaft, having a downwardly and forwardly extending arm, the sliding till-cover having a slotted arm with which said arm engages, the arms connected with the segments, the spring-actuated pitmen pivoted to said arms, the registering-key, and a registering mechanism actuated by said pitmen, substantially as described.

17. In a cash-register, the combination of the supporting-frame, the indicating-keys having hooks near their rear ends, the transverse bail having a plate with which said hooks engage, the spring-actuated hooked arm engaging with said bail, the vertical bars provided with lugs which vary in height, connected with said keys, the bails having transverse plates with which the upper ends of said rods engage, the downwardly-depending hooked arms secured to said bails, the transverse shaft journaled in said frame, the segments journaled on said shaft, having horizontal bars adapted to engage with said arms, the radial pins on said segments, the springs for actuating the same, the bail pivoted to said shaft, having a downwardly and forwardly depending arm, the sliding till-cover having a slotted arm and an upwardly-extending central arm at its rear end, the arms connected with the segments, the spring-actuated pitmen pivoted to said arms, the registering mechanism substantially such as described, the registering-key having a downwardly-depending hooked pivoted arm, and the transverse bail with which said arm is adapted to engage, substantially as described.

In testimony that I claim the foregoing as my own I have hereunto affixed my signature in presence of two witnesses.

OLE TVERDAL.

Witnesses:
LOUIS BAGGER,
BENNETT S. JONES.